C. KACSEROWSKY.
Soot-Brushes.

No. 150,164.

Patented April 28, 1874.

ATTEST.

INVENTOR.

UNITED STATES PATENT OFFICE.

CARL KACSEROWSKY, OF CHICAGO, ILLINOIS.

IMPROVEMENT IN SOOT-BRUSHES.

Specification forming part of Letters Patent No. 150,164, dated April 28, 1874; application filed February 7, 1874.

*To all whom it may concern:*

Be it known that I, CARL KACSEROWSKY, of Chicago, in the county of Cook and State of Illinois, have invented an Improvement in Brushes for Cleaning Stove-Pipes, of which the following is a specification:

This invention has for its object to provide a simple and inexpensive brush, by means of which stove-pipes may be cleaned without taking them down and removing them for that purpose; and it consists in a wooden cylinder armed with two rows of stiff wooden or other fibers around its periphery, with a bale on one end, to which is connected one end of a cord, having a leaden ball at the other end, to enable the operator to throw it through the pipes, which are disconnected at one end or point in their length, so that the operator can draw the brush through to remove the accumulated soot and ashes.

Figure 1:
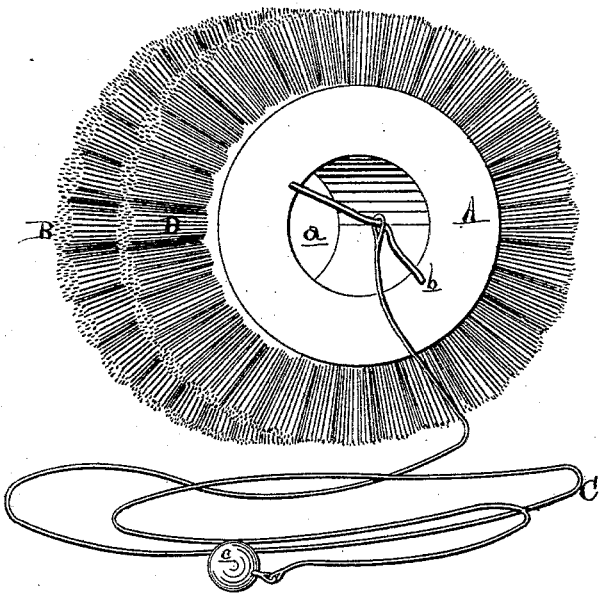
Figure 2:
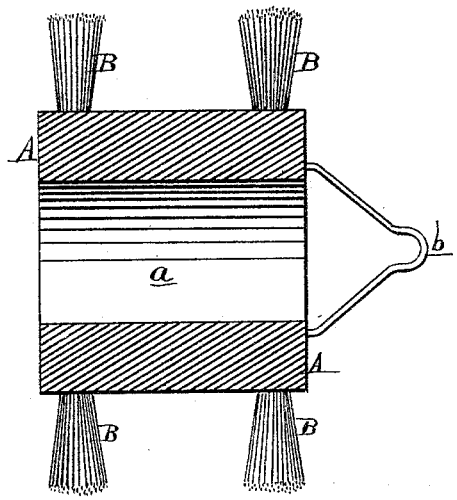

Figure 1 is a perspective view. Fig. 2 is a longitudinal section.

In the drawing, a represents a wooden cylinder, having an opening, $a$, through it, converting it into a cylindrical shell. B B are two rows of stiff wooden fibers inserted in the periphery of the cylinder. Across one end is secured a wire-bale, $b$, to which is attached one end of a cord, C, to the other end of which is secured a leaden or other metal ball, $c$.

Long lengths of stove-pipe may be cleaned by throwing the ball through, and by the cord drawing through the brush, which turns the elbows easily, any surplus of sooty deposits and ashes passing through the hole $a$.

Any other material than wood fibers may be used to make the brush, but the former is preferable on account of its cheapness.

What I claim as my invention, and desire to secure by Letters Patent, is—

The combination of the wooden cylinder A, having the opening $a$, and provided with the brush B, bale $b$, cord C, and ball $c$, as and for the purpose set forth.

CARL KACSEROWSKY.

Witnesses:
 WM. H. LOTZ,
 ABRAHAM GOTSHELP.